United States Patent [19]
Higurashi et al.

[11] Patent Number: 5,999,350
[45] Date of Patent: *Dec. 7, 1999

[54] RECORDING/REPRODUCING METHOD OF DIGITAL DATA AND A RECORDING MEDIUM

[75] Inventors: Seiji Higurashi, Tokyo; Takeo Ohishi, Yokohama, both of Japan

[73] Assignee: Victor Company of Japan, Ltd., Japan

[*] Notice: This patent is subject to a terminal disclaimer.

[21] Appl. No.: 08/552,848

[22] Filed: Nov. 3, 1995

Related U.S. Application Data

[63] Continuation of application No. 08/278,240, Jul. 21, 1994, Pat. No. 5,552,941.

[30] Foreign Application Priority Data

Aug. 5, 1993 [JP] Japan .................................. 5-213344

[51] Int. Cl.$^6$ .............................. G11B 5/09; H04N 5/91; H04N 5/926
[52] U.S. Cl. .................. 360/48; 386/96; 386/124
[58] Field of Search ............... 360/19.1, 48, 64; 386/124, 40, 95, 96

[56] References Cited

U.S. PATENT DOCUMENTS

| | | |
|---|---|---|
| 4,758,911 | 7/1988 | Nakano et al. . |
| 5,172,380 | 12/1992 | Odaka . |
| 5,274,772 | 12/1993 | Dunn et al. . |
| 5,396,374 | 3/1995 | Kubota et al. ................. 360/19.1 X |
| 5,552,941 | 9/1996 | Higurashi et al. ................. 360/48 |

FOREIGN PATENT DOCUMENTS

| | | |
|---|---|---|
| 0406188 | 2/1991 | European Pat. Off. . |
| 4-366469 | 12/1992 | Japan . |

*Primary Examiner*—Aristotelis M. Psitos
*Assistant Examiner*—Regina Y. Neal
*Attorney, Agent, or Firm*—Rossi & Associates

[57] ABSTRACT

A recording/reproducing method which is capable of responding to the recording of various applications by flexibly changing the format of recording regions on a track of a recording medium. A track 20 is divided into a plurality of recording regions 22–32, and the data format of each recording region is selected in accordance with applications to be recorded. The preamble (or IBG) $E_{PI}$ is provided at the head portion of a track and the recording region to be independently rewritten or reloaded as occasion demands. A format information $D_{PI}$ indicating the presence of preamble or IBG is recorded in the data region $E_D$. By designating required number of recording regions using the preamble (or IBG) $E_{PI}$, it becomes possible to flexibly respond to the recording of various applications.

31 Claims, 5 Drawing Sheets

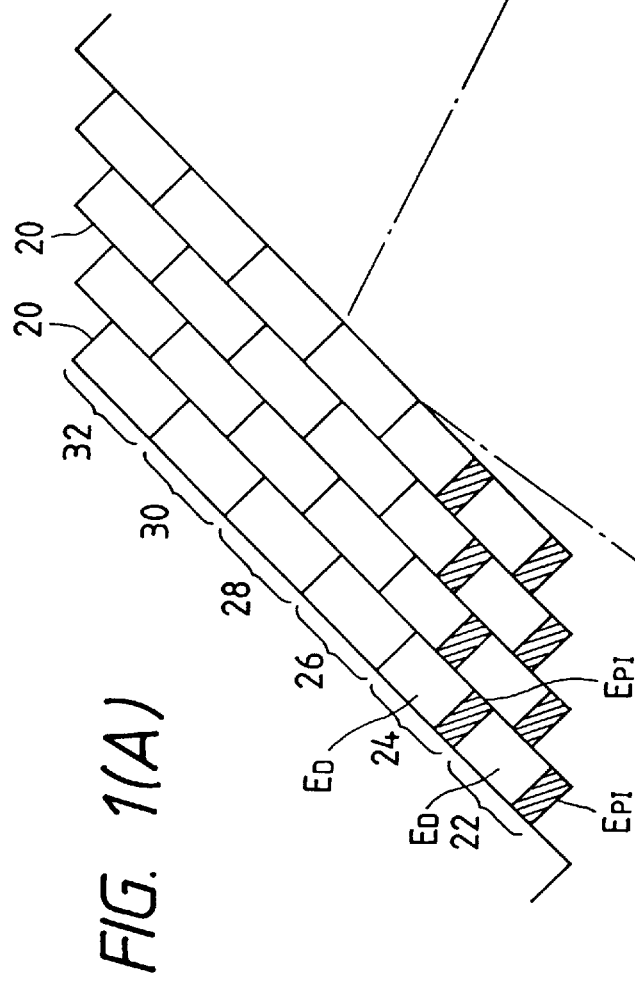
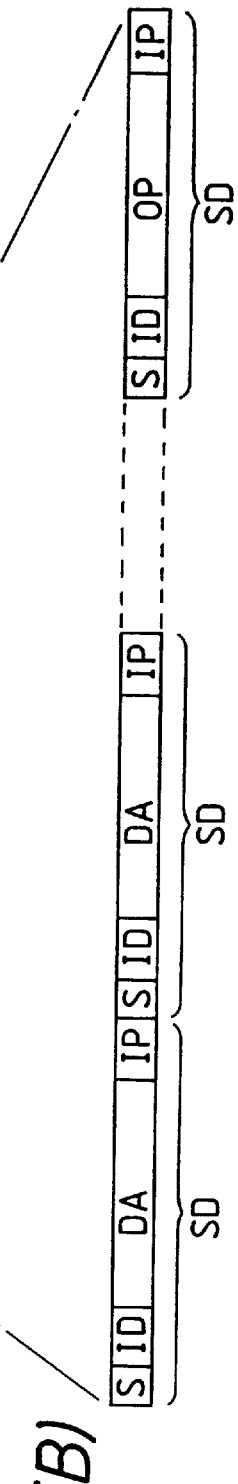
FIG. 1(A)
FIG. 1(B)

RECORDING/REPRODUCING METHOD OF DIGITAL DATA AND A RECORDING MEDIUM

This is a Continuation of application Ser. No. 08/278,240 filed Jul. 21, 1994, now U.S. Pat. No. 5,552,941.

BACKGROUND OF THE INVENTION

1. Field of the Invention

The present invention relates to a recording/reproducing method of digital data and a recording medium, and more particularly to an improvement of a recording/reproducing method of digital data and a recording medium, for example, preferably used for assigning or allocating signals of a plurality of applications, such as audio signals and video signals, to the recording regions on a recording medium such as a magnetic tape.

2. Prior Art

In recording audio signals and video signals onto a magnetic tape, a normally well-known method is a helical scanning method by which recording tracks are formed in parallel with each other and obliquely with respect to the tape travelling direction on the magnetic tape. FIG. 6 shows one example of recording mode of a magnetic tape having recording tracks formed based on such a conventional helical scanning method. Each recording track 10 is basically divided into two data recording regions, one being an audio recording region 12 and the other being a video recording region 14. An interblock gap (IBG) $E_I$ is disposed between these audio recording region 12 and video recording region 14. Furthermore, a preamble $E_P$ is provided at the head of each of these audio and video recording regions 12 and 14.

The preamble $E_P$ is a portion containing information for assisting clock signal reproduction and data extraction. The interblock gap $E_I$ is a space for separating two blocks (audio and video recording regions 12 and 14) of data on a magnetic tape and for securing positional margin. In general, the size of these audio recording region 12, video recording region 14 and interblock gap $E_I$ is fixed. In some cases, each region designated by the preamble or the interblock gap may not be clearly discriminated, or either one of them may be provided for functioning for both purposes.

However, according to such a conventional technology, the position of the preamble $E_P$ or the interblock gap $E_I$ is pre-designated; it is therefore impossible to perform a data rewriting or data reloading operation at a position other than the preamble $E_P$ or interblock gap $E_I$. Meanwhile, when various data amounts of applications are transacted, it is necessary to change the assignment or allocation of the recording regions in a section in accordance with data amount of each of applications combined and recorded. To realize this, it will be required to prepare numerous preambles and IBGs in advance, which however results in waste of some preambles or interblock gaps assigned or allocated at the positions where data need not be rewritten or reloaded. Accordingly, it is difficult to effectively use the recording regions in accordance with the content or type of the applications.

Particularly, when the data amount is different in each application, it is necessary to change the assignment or allocation of the recording regions in accordance with the combination of applications. However the above-described conventional technology has no capability of performing such an alteration; as a result, it is difficult to transact various types of applications.

SUMMARY OF THE INVENTION

Accordingly, in view of above-described problems encountered in the prior art, a principal object of the present invention is to provide a recording/reproducing method of digital data and a recording medium, by which assignment or allocation of the recording regions on a track is flexibly changed, thereby flexibly transacting various data amounts of applications.

In order to accomplish this and other related objects, a first aspect of the present invention provides a digital data recording method comprising steps of: dividing a predetermined data section on a recording medium into a plurality of recording regions; selecting a data format of each recording region on the basis of content of an application to be recorded; and memorizing format information selected into a corresponding recording medium.

A second aspect of the present invention provides a recording medium comprising: a predetermined data section which is divided into a plurality of recording regions; each recording region having a data format selected on the basis of content of an application to be recorded; and the recording medium memorizing format information selected.

In a preferable mode, the predetermined data section is one track on the recording medium and is divided into a plurality of consecutive recording regions each having the same length or size. The consecutive recording regions consist of at least two groups, each group having a preamble at a head thereof, thereby assigning recording regions of respective groups to different kinds-of recording signals. A preamble is provided at the head of independently rewritable recording regions only, and the preamble has also a function of interblock gap separating recording signals different from each other. Selection of data format is accomplished by replacing a head portion of the recording region by a preamble or an interblock gap. The data format consists of various data including main data, sync data (sync pattern), identification data, inner parity and outer parity. A double coding block defined by the inner and outer codes constitutes a unit for determining a region to be designated by a preamble or an interblock gap. A data region equivalent to a certain multiple of a sync data block ranging from the sync signal to the inner parity is a unit for determining a region to be designated by a preamble or an interblock gap. An ordinary data region including data regions for the main data and the identification data partly contains the format information indicating presence or absence of a preamble or an interblock gap. The format information also includes information relating to size of the preamble or interblock gap. A plurality of recording regions are encoded in compliance with a single format.

Furthermore, a third aspect of the present invention provides a digital data reproducing method comprising steps of: reproducing data from a recording medium, the recording medium including a predetermined data section divided into a plurality of recording regions, each recording region having a data format selected on the basis of content of an application to be recorded; and utilizing a format information memorized in the recording medium for reproducing data from the recording section.

In the third aspect of the present invention, the step of utilizing the format information discriminates a recording region containing a preamble or interblock gap from other recording regions, thereby allowing recording signals to be reproduced properly in accordance with the content of the application.

In accordance with the present invention, the data format of each recording region is selected in accordance with the content of an application to be recorded; thus, assignment or allocation of recording regions can be flexibly changed in response to various applications.

For example, selection is made as to whether a part of a recording region is used for preamble (or IBG) or the recording region is used as a data region. A format information is added for indicating the data format of each recording region; i.e. information indicating the presence or absence of preamble (or IBG) is memorized. In reproducing operation of digital data, this format information is utilized to judge whether the recording region to be reproduced contains a preamble or IBG.

BRIEF DESCRIPTION OF THE DRAWINGS

The above and other objects, features and advantages of the present invention will become more apparent from the following detailed description which is to be read in conjunction with the accompanying drawings, in which:

FIGS. 1(A) and 1(B) are views illustrating one recording mode of tracks recorded on a magnetic tape in accordance with one embodiment of data recording method of the present invention;

DETAILED DESCRIPTION OF THE PREFERRED EMBODIMENTS

Figure 2A:
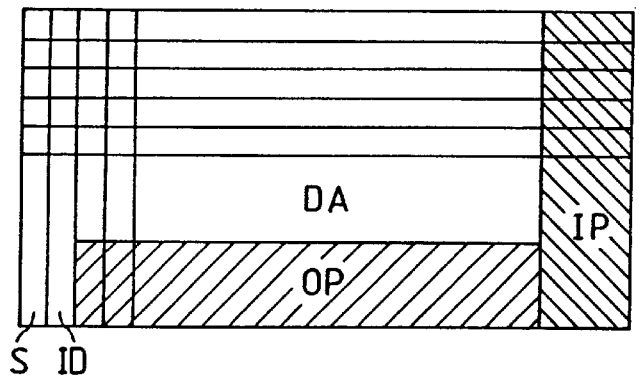
FIGS. 2(A) and 2(B) are views illustrating data format of recording regions in accordance with the above embodiment of the present invention.

Preferred embodiments of the recording/reproducing method of digital data and a recording medium in accordance with the present invention will be explained in detail hereinafter, with reference to the accompanying drawings.
<Recording of Data>

FIG. 1(A) shows an embodiment of the track pattern in accordance with the present invention. According to this embodiment, one track 20 is divided into six consecutive recording regions (blocks) 22, 24, 26, 28, 30 and 32, each having the same length or size. It is assumed that, of transmission data equivalent to one track, 1/6 is audio signals and 5/6 is video signals. In such a case, one block (i.e. recording region 22) of one track 20 is allocated for the audio signals and the remaining five blocks (i.e. recording regions 24, 26, 28, 30 and 32) are allocated for the video signals.

In this case, if there is a requirement of independently rewriting or reloading the audio signals and the video signals, a part of the recording region 22, which is the head portion of the audio signals, and/or a part of the recording region 24, which is the head portion of the video signals, will be respectively allocated for the preamble (or IBG) $E_{PI}$.

Meanwhile, when there is no requirement of independently rewriting or reloading the audio signals and the video signals, the preamble is provided only at the head portion of the recording region preceding others; i.e. at the head of the track. In the case of the embodiment shown in FIG. 1(A), the preamble $E_{PI}$ is provided at the head portion of the recording region 22. The preamble $E_{PI}$ of the recording region 24 has a function of interblock gap (IBG) as well.

Figure 2B:
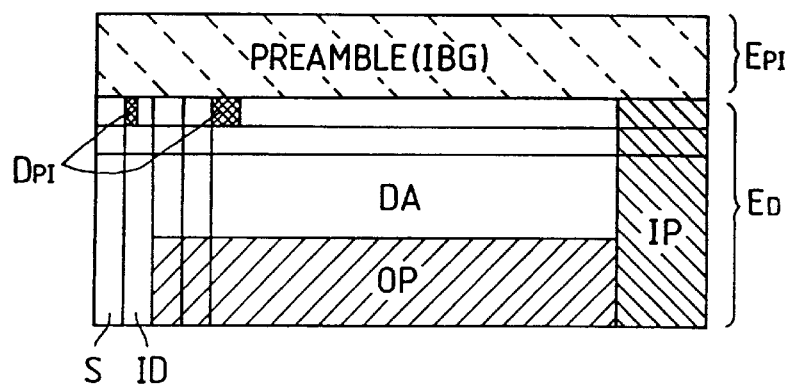
Figure 6:
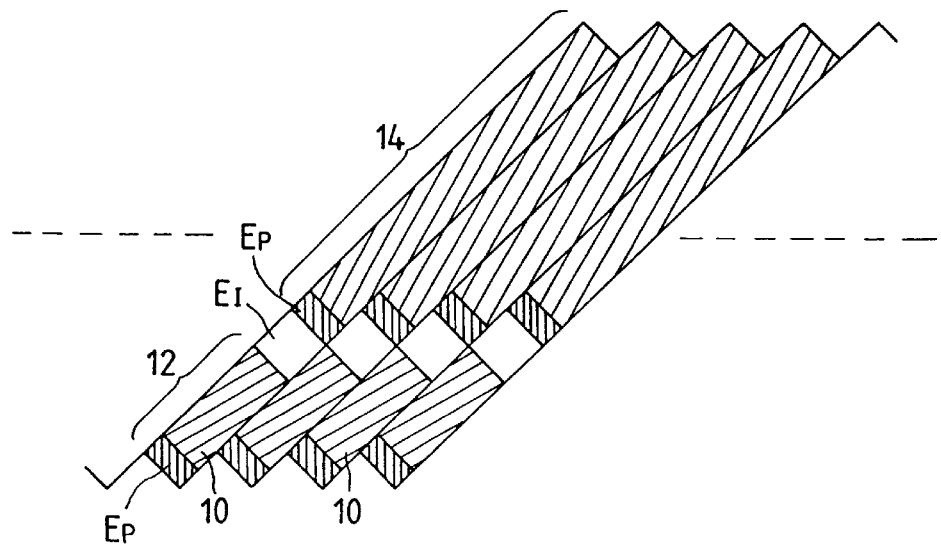
FIG. 6 is a view illustrating a conventional recording mode of tracks recorded on a magnetic tape.

FIGS. 2(A) and 2(B) show formats of the data block to be recorded. FIG. 2(A) shows a format applicable to the recording region containing no preamble (or interblock gap) $E_{PI}$, such as the recording regions 26, 28, 30, and 32 of FIG. 1(A). As shown in FIG. 1(B), each of these recording regions 26, 28, 30, and 32 includes various data such as main data DA, sync data S (sync pattern), identification data ID, inner parity IP and outer parity OP (error correcting inner and outer codes) as occasion demands.

Furthermore, FIG. 2(B) shows a format applicable to the recording region containing a preamble (or IBG) $E_{PI}$, such as the recording regions 22 and 24 of FIG. 1(A). As apparent from the drawing, this FIG. 2(B) format is different from the above FIG. 2(A) format in that the head portion of the recording region is replaced by the preamble (or IBG) $E_{PI}$. Data arranged in accordance with either of these two formats are recorded on one recording region of the track 20; for example, FIG. 1(B) shows data stream according to the FIG. 2(A) format.

According to this embodiment a double coding block defined by the inner parity IP and the outer parity OP shown in FIGS. 2(A) and 2(B) constitutes a unit for determining a region to be designated by preamble or IBG. That is, the data region equivalent to a certain multiple of a sync data block SD (refer to FIG. 1(B)) ranging from the sync signal S to the inner parity IP is a unit to be or not to be assigned to the preamble or IBG. Namely, the preamble or IBG has a function of designating a term corresponding to a multiple of sync data block SD.

According to such a format, the following merits are acquired:

[1] The construction of circuit is simplified, since timing design is feasible by regarding the recording track as a certain multiple of a fixed unit—a repetition number N×{inner parity length×outer parity length (including the length of the preamble or IBG)}; and

[2] The construction of processing circuits is simplified, since the double coding block allows only one pattern in the construction of inner and outer parities. (If the unit for determining the size of data region assigned by the preamble or IBG is decided irrelevantly to the multiple of a sync data block SD, there will be many types of long and short outer parities and inner parities, which complicates the construction of codes and processing circuits.)

According to the present invention, in the recording regions 22 and 24, the ordinary data region $E_D$ other than the preamble (or IBG) $E_{PI}$, such as the identification data (ID) region and the main data (DA) region, partly contains the information indicating that the corresponding recording region is assigned to the preamble (or IBG) $E_{PI}$. FIG. 2(B) shows this in more detail; namely, the format information $D_{PI}$ indicating the presence of the preamble (or IBG) $E_{PI}$ is recorded in a part of the identification data (ID) region or the main data (DA) region.

When the length of the term of preamble or IBG is variable, the format information $D_{PI}$ will contain information relating to the size of the term of preamble or IBG as well.

Next, an operation of the embodiment of the present invention will be explained. As described above, the recording region 22 is assigned to audio signals while the remaining recording regions 24, 26, 28, 30 and 32 are assigned to video signals. (Referred to as a first condition, hereinafter) To independently rewrite or reload the audio signals and the video signals, the preamble $E_{PI}$ is provided at each of the head portion (recording region 22) of the audio signals and the head portion (recording region 24) of the video signals. The preamble $E_{PI}$ provided at the head portion of the recording region 24 has also a function of IBG separating the audio signals and the video signals.

Figure 3:
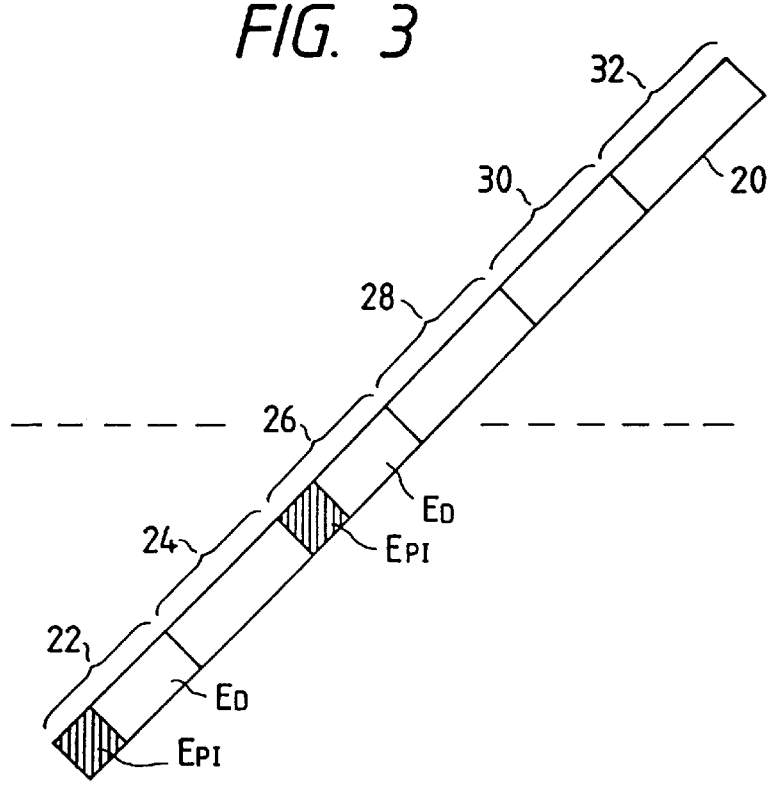
FIG. 3 is a view illustrating another recording mode of the track on a magnetic tape in accordance with the above embodiment of the present invention.

Next, it is assumed that the data rate is changed from the above first condition to a second condition where, of the transmission data equivalent to one track, 2/6 is audio signals and 4/6 is video signals. In such a case, two blocks (i.e. recording regions 22 and 24) of one track 20 are allocated for the audio signals and the remaining four blocks (i.e. recording regions 26, 28, 30 and 32) are allocated for the video signals, as shown in FIG. 3.

In this case, if there is a requirement of independently rewriting or reloading the audio signals and the video signals, a part of the recording region 22, which is the head portion of the audio signals, and/or a part of the recording region 26, which is the head portion of the video signals, will be respectively allocated for the preamble $E_{PI}$. Meanwhile, when there is no requirement of independently rewriting or reloading the audio signals and the video signals, the preamble $E_{PI}$ is provided only at the head portion of the recording region 22 preceding others. The preamble $E_{PI}$ of the recording region 26 has also a function of interblock gap (IBG).

Figure 4:
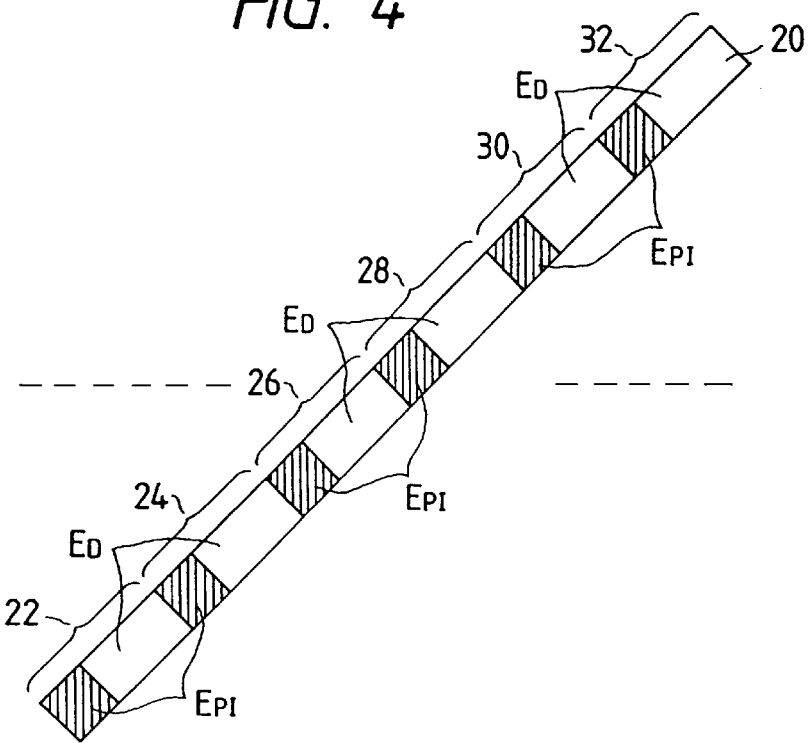
FIG. 4 is a view illustrating still another recording mode of the track on a magnetic tape in accordance with the above embodiment of the present invention.

Next, it is further assumed that the data rate is changed from the above second condition to a third condition where one track consists of six kinds of signals, each kind occupying 1/6 of the transmission data equivalent to one track. In such a case, each of six blocks (i.e. recording regions 22, 24, 26, 28, 30 and 32) of one track 20 is assigned to each of six kinds of signals, as shown in FIG. 4. In this case, if there is a requirement of independently rewriting or reloading each of the six kinds of signals, the head of each recording region 22, 24, 26, 28, 30 or 32, which is the head portion of each kind of signals, will be respectively allocated for the preamble $E_{PI}$.

Meanwhile, when there is a requirement of independently rewriting or reloading only a part of six kinds of signals and the video signals, the preamble $E_{PI}$ is provided at the preceding recording region 22 and at the head portion of the corresponding recording regions only. For example, if the fifth signal needs to be rewritten, only the recording regions 22 and 30 will be provided with the preamble $E_{PI}$.

<Reproduction and Edit of Data>

Next, a reproduction operation for reproducing data recorded as explained above will be explained. Each track has a preamble at the head portion thereof irrespective of recording type or conditions. When the recording region includes the preamble or IBG, the data region $E_D$ of this recording region contains the format information $D_{PI}$ indicating the presence of preamble or IBG possibly together with its size, as shown in FIG. 2(B).

By checking this format information $D_{PI}$ in the reproducing operation, it becomes possible to discriminate the recording region containing the preamble or IBG from other recording regions. In other words, the data format of each recording region can be identified on the basis of the format information $D_{PI}$, thereby allowing the recording signals to be reproduced properly in accordance with the data recording format.

Next, the data edit operation will be explained. The data edit operation is carried out by utilizing the preamble $E_{PI}$ which is always provided at the head portion of the data recording region to be rewritten, in such a manner that only the data region designated by this preamble $E_{PI}$ is independently edited. If data are recorded into a vacant region, additional recording will be easily accomplished by providing the preamble (or IBG) $E_{PI}$ as shown in FIG. 2(B).

As described above, in accordance with the embodiment of the present invention, one track is divided into a plurality of recording regions and the data in each recording region are formatted in accordance with the similar method. Then, the sync block SD in this format is used as a unit for determining the size of data region designated by the preamble or IBG. The format information $D_{PI}$ indicating the presence of the preamble or IBG possibly together with the length of its term is written in the data region $E_D$. Thus, responding flexibly to various applications is feasible by utilizing the recording regions divided into the required number in accordance with the content of signals to be recorded.

By providing the preamble $E_{PI}$ at a plurality of recording regions as occasion demands, it becomes possible to secure, in one track, required number of recording regions whose data are rewritable or reloadable independently. The preamble $E_{PI}$ should be provided at the head of each track and at the head of independently rewritable recording region only; therefore, there is no need to secure a region for the preamble for rewriting in the case where data need not be rewritten. For this reason, it becomes possible to effectively use the recording regions and, thus, increase of redundancy due to addition of the preambles $E_{PI}$ can be suppressed at a minimum level.

Furthermore, as the signal processing of each recording region is fundamentally the same, there is an advantage that circuit burden imposed for responding to various kinds of signals can be reduced.

<Other Embodiments>

The present invention is not limited to the above-disclosed embodiment, and therefore can be modified in the following manner.

[1] Although one track is divided into six recording regions in the above-described embodiment, the number of the recording regions divided can be increased or decreased as occasion demands.

[2] The data format is not fixed to the one disclosed in FIGS. 2(A) and 2(B), and therefore can be adequately modified as occasion demands. For example, although the FIG. 2(B) example includes the combined preamble and IBG, it will be possible to assign the first some sync blocks to IBG and the next some sync blocks to preamble. Furthermore, it will be possible to replace the preamble by IBG or, alternatively, replace the IBG by preamble. Moreover, it will be possible to provide both.

[3] Although the present invention is applied to a helical scanning type tape medium in the above-described embodiment, the present invention can be applied to other recording disk media similarly. Besides the combination of audio signals+video signals in the above-described embodiment, mode of applications would be selected from combinations of various signals, such as (1) audio signals+ high-grade video signals; (2) audio signals+low-grade video signals+low-grade video signals; (3) audio signals×6; (4) data×3, or the like.

[4] Although the format information $D_{PI}$ indicating the presence of preamble or IBG together with its size is recorded in the data region $E_D$ succeeding the corresponding preamble or IBG in the above-described embodiment, it is alternatively possible to record the information indicating the absence of preamble or IBG in the data region $E_D$ of the block containing no preamble or IBG. Furthermore, it is also possible to record both kinds of format information in the corresponding data regions $E_D$, respectively, one for indicating the presence of preamble or IBG and the other for indicating the absence thereof.

[5] Although each block of the above-described embodiment has a predetermined format for recording data, it is possible to encode a plurality of regions in compliance with a single format when an execution of an application requires a plurality of divide blocks. There may be information indicating such an encoding.

Figure 5A:
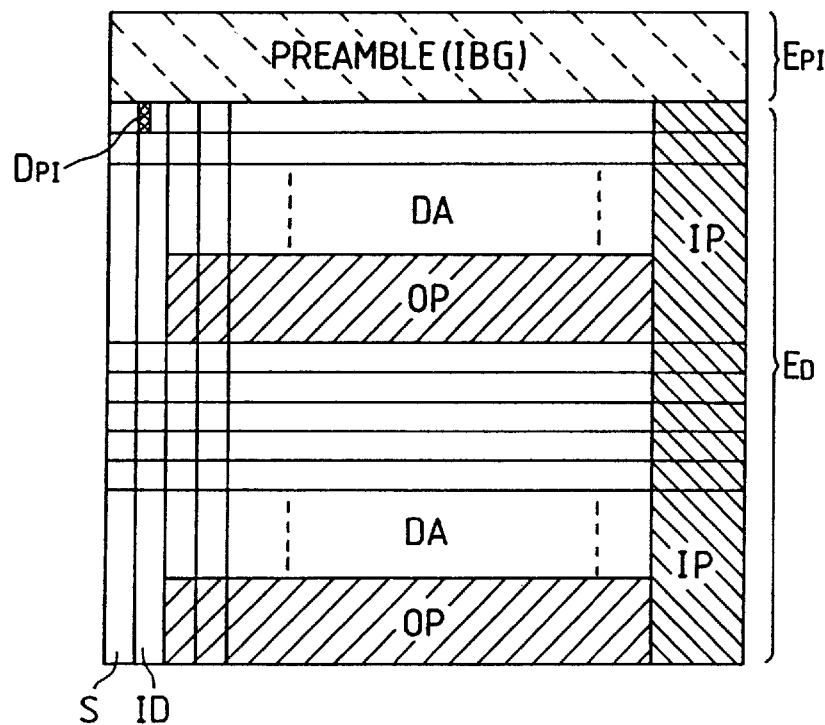
FIGS. 5(A) and 5(B) are views illustrating another data format of recording regions in accordance with the above embodiment of the present invention.
Figure 5B:
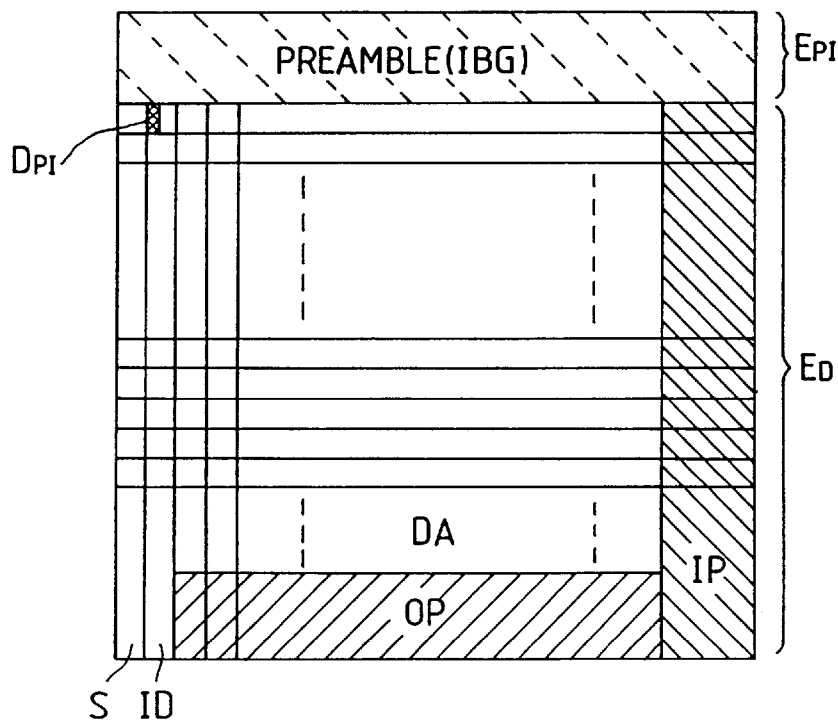

For example, by combining each two of six blocks in the above-described embodiment, it becomes possible to record the signals in accordance with the format shown in FIGS. 5(A) and 5(B).

Figure 7A:
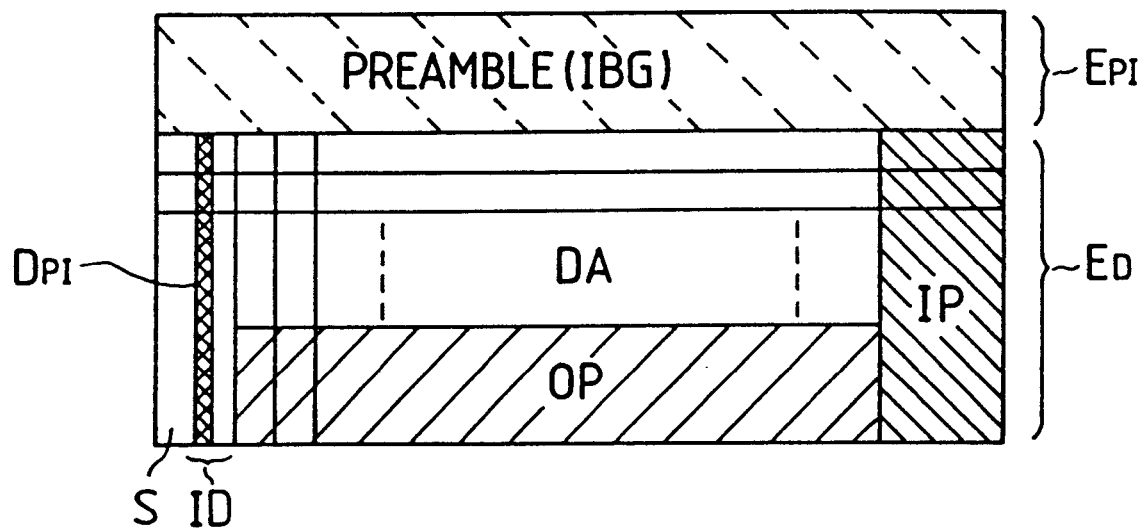
FIGS. 7(A) and 7(B) are views illustrating another recording pattern of format information $D_{PI}$.
Figure 7B:
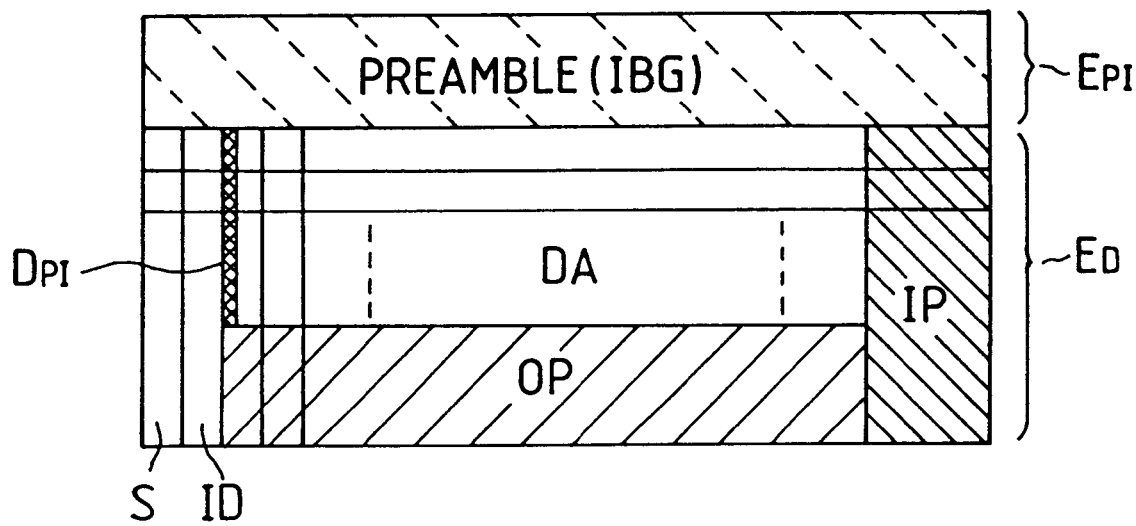

[6] Although the format information $D_{PI}$ is recorded as a part of the identification data ID or the main data DA in the above-described embodiment, it is allowable to record it at adequate portions as occasion demands. FIGS. 7(A) and 7(B) show other formats for recording data. Furthermore, changing the sync signal pattern would be useful as a means for giving the format information $D_{PI}$.

[7] Although the above-described embodiment deals with the format information as a part of the recording data, other embodiments for obtaining the format information in the reproducing operation would be as follows:

(1) A method of representing the format based on the combination of presence of ID holes of a tape cassette;

(2) A method of memorizing the format information in the IC memory installed in a tape cassette and utilizing this format information;

(3) A method of specifying the format based on the combination of electric ON/OFF patterns installed on a tape cassette;

(4) A method of discriminating the format based on the configuration of a tape cassette; and (5) A method of specifying the format based on the content of a bar code printed or attached at a part of a tape cassette.

As described in the forgoing description, the recording/reproducing method of digital data and a recording medium in accordance with the present invention bring the following effects.

[1] As a predetermined data recording section is divided into a plurality of recording regions and a format of each recording region is selected in accordance with the content of an application to be recorded, it becomes possible to execute the recording of data flexibly responding to a combination of applications having different data amount.

[2] As the format information indicating the selected format of each recording region is added, it becomes possible to execute the reproduction of data properly even if the data format of each recording region is different from each other.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A digital data recording method comprising the steps of:

dividing a predetermined data section on a recording medium into a plurality of consecutive recording regions having the same length or size;

selecting a data format of each recording region on the basis of content of an application to be recorded, said format being selectable in accordance with an arrangement comprising at least one block selected from a group consisting of a first block, a second block and a third block, said first block being a sync block including a single sync signal data region, a single identification data region, a single main data region, and a single inner parity data region, said second block being a sync block including a single sync signal data region, a single identification data region, a single outer parity data region, and a single inner parity data region, said third block being a specific code pattern having the same length or size as said first and second blocks; and recording information of said predetermined data sections on the recording medium in accordance with said selected data format and memorizing format information representing the selected data format into a predetermined area of said recording medium;

wherein selection of said data format for said recording region is accomplished by replacing a head portion of a recording region by a preamble or an interblock gap.

2. A digital data recording method in accordance with claim 1, wherein said predetermined data section is one track on the recording medium.

3. A digital data recording method in accordance with claim 1, wherein said consecutive recording regions consist of at least two groups, each group having a preamble at a head thereof, thereby assigning recording regions of respective groups to different kinds of recording signals.

4. A digital data recording method in accordance with claim 1, wherein a preamble is provided at the head of independently rewritable recording regions only.

5. A digital data recording method in accordance with claim 4, wherein said preamble has also a function of interblock gap separating recording signals different from each other.

6. A digital data recording method in accordance with claim 1, wherein a plurality of recording regions are encoded in compliance with a single format.

7. A digital data recording method in accordance with claim 1, wherein said data format has a sync data block including an inner parity, so that units of said sync data block are identical with a region sectioned by said inner parity.

8. A digital data recording method in accordance with claim 1, wherein said head portion of the recording region is said third block.

9. A digital data recording method comprising the steps of:

dividing a predetermined data section on a recording medium into a plurality of consecutive recording regions having the same length or size, each recording region comprising a plurality of data blocks each having the same length or size and including at least one region selected from a group consisting of a single sync signal data region, a single identification data region, a single main data region, a single inner parity data region, a single outer parity region, and a specific code pattern region;

selecting a data format of each recording region on the basis of content of an application to be recorded; and memorizing selected format information into a corresponding recording medium;

wherein said data format consists of various data including main data, sync pattern, identification data, inner and outer parities, and said inner and outer parities cooperatively define units for identifying a data region to be designated by a preamble or an interblock gap.

10. A digital data recording method comprising the steps of:

dividing a predetermined data section on a recording medium into a plurality of consecutive recording regions having the same length or size, each recording region comprising a plurality of data blocks each having the same length or size and including at least one region selected from a group consisting of a single sync signal data region, a single identification data region, a single main data region, a single inner parity region, a single outer parity data region, and a specific code pattern region;

selecting a data format of each recording region on the basis of content of an application to be recorded; and memorizing selected format information into a corresponding recording medium;

wherein said data format consists of various data including main data, sync pattern, identification data, inner and outer parities, and said plural data blocks, each having said sync pattern as a head and said inner parity as a tail, form units for identifying a data region to be designated by a preamble or an interblock gap.

11. A recording medium comprising:

a predetermined data section which is divided into a plurality of consecutive recording regions having the same length or size;

each recording region having a data format selected on the basis of content of an application to be recorded, said data format being selectable in accordance with an arrangement comprising at least one block selected from a group consisting of a first block, a second block and a third block, said first block being a sync block including a single sync signal data region, a single identification data region, a single main data region, and a single inner parity data region, said second block being a sync block including a single sync signal data region, a single identification data region, a single outer parity data region, and a single inner parity data region, said third block being a specific code pattern having the same length or size as said first and second blocks;

wherein information of said predetermined data section is recorded on the recording medium in accordance with said selected data format and format information representing the selected data format is memorized into a predetermined area of said recording medium; and selection of said data format for said recording region is accomplished by replacing a head portion of a recording region by a preamble or an interblock gap.

12. A recording medium in accordance with claim 11, wherein said predetermined data section is one track on the recording medium.

13. A recording medium in accordance with claim 11, wherein said consecutive recording regions consist of at least two groups, each group having a preamble at a head thereof, thereby assigning recording regions of respective groups to different kinds of recording signals.

14. A recording medium in accordance with claim 11, wherein a preamble is provided at the head of independently rewritable recording regions only.

15. A recording medium in accordance with claim 14, wherein said preamble has also a function of interblock gap separating recording signals different from each other.

16. A recording medium in accordance with claim 11, wherein a plurality of recording regions are encoded in compliance with a single format.

17. A recording medium in accordance with claim 11, wherein said head portion of the recording region is said third block.

18. A recording medium comprising:

a predetermined data section which is divided into a plurality of consecutive recording regions having the same length or size, each recording region comprising a plurality of data blocks each having the same length or size and including a single or a plurality regions selected from a group consisting of a single sync signal data region, a single identification data region, a single main data region, a single inner parity data region, a single inner parity data region, and a specific code pattern;

each recording region having a data format selected on the basis of content of an application to be recorded; and said recording medium memorizing selected format information, wherein said data format consists of various data including main data, sync pattern, identification data, inner and outer parities, and said inner and outer parities cooperatively define units for identifying a data region to be designated by a preamble or an interblock gap.

19. A recording medium comprising:

a predetermined data section which is divided into a plurality of consecutive recording regions having the same length or size, each recording region comprising a plurality of data blocks each having the same length or size and including at least one region selected from a group consisting of a single sync signal data region, a single identification data region, a single main data region, a single inner parity data region, a single outer parity data region, and a specific code pattern region;

each recording region having a data format selected on the basis of content of an application to be recorded; and said recording medium memorizing selected format information, wherein said data format consists of various data including main data, sync pattern, identification data, inner and outer parities, and consecutive plural data blocks, each having said sync pattern as a head of and said inner parity as a tail, form units for identifying a data region to be designated by a preamble or an interblock gap.

20. A digital data reproducing method comprising the steps of:

reproducing data from a recording medium, said recording medium including a predetermined data section divided into a plurality of consecutive recording regions having the same length or size, and each recording region having a data format selected on the basis of content of an application to be recorded, said data format being selectable in accordance with an arrangement comprising at least one block selected from a group consisting of a first block, second block and a third block, said first block being a sync block including a single sync signal data region, a single identification data region, a single main data region, and a single inner parity data region, said second block being a sync block including a single sync signal data region, a single identification data region, a single outer parity region, and a single inner parity data region, said third block being a specific code pattern having the same length or size as said first and second blocks;

recording information of said predetermined data section on the recording medium in accordance with said selected data format and memorizing format information representing the selected data format into a predetermined area of said recording medium; and utilizing the format information stored in the predetermined area of said recording medium for reproducing data from said recording section, wherein said step of utilizing the format information is for discriminating a recording region containing a preamble or interblock gap from other recording regions, thereby allowing recording signals to be reproduced properly in accordance with the content of the application.

21. A digital data recording method comprising the steps of:

dividing information of one track on a recording medium into a plurality of consecutive recording regions, each having the same length or size and including a portion being replaceable by discrimination data;

selecting a data format of each recording region on the basic of content of an application to be recorded, so that a combination of recording regions meets a format of said application, said data format being selectable in accordance with an arrangement comprising at least one block selected from a group consisting of a first block, a second block and a third block, said first block being a sync block including a single sync signal data region, a single identification data region, a single main data region, and a single inner parity data region, said second block being a sync block including a single sync signal data region, a single identification data region, a single outer parity data region, and a single inner parity data region, said third block being a specific code pattern having the same length or size as said first and second blocks; and recording said information on the recording medium in accordance with said data format and memorizing format information representing the selected data format into at least one of a predetermined area of said recording medium and a holder for accommodating said recording medium, wherein selection of said data format for said recording region is accomplished by replacing a head portion of a recording region by a preamble or an interblock gap.

22. A digital data recording method in accordance with claim 21, wherein said head portion of the recording region is said third block.

23. A recording medium comprising:

a track which is divided into a plurality of consecutive recording regions, each having the same length or size and including a portion being replaceable by discrimination data; and each recording region having a data format selected on the basic of content of an application to be recorded, so that a combination of recording regions meets a format of said application, said data format being selectable in accordance with an arrangement comprising at least one block selected from a group consisting of a first block, a second block and a third block, said first block being a sync block including a single sync signal data region, a single identification data region, a single main data region, and a single inner parity data region, said second block being a sync block including a single sync signal data region, a single identification data region, a single outer parity data region, and a single inner parity data region, said third block being a specific code pattern having the same length or size as said first and second blocks;

wherein said information on the recording medium is recorded in accordance with said data format and format information representing the selected data format is memorized into at least one of a predetermined area of said recording medium and a holder for accommodating said recording medium, and selection of said data format of said recording region is accomplished by replacing a head portion of a recording region by a preamble or an interblock gap.

24. A recording medium in accordance with claim 23, wherein said head portion of the recording region is said third block.

25. A digital data reproducing method comprising the steps of:

reproducing data from a recording medium, said recording medium including a track divided into a plurality of consecutive recording regions, each having the same length or size and including a portion being replaceable by discrimination data, each recording region having a data format selected on the basic of content of an application to be recorded, so that a combination of recording regions meets a format of said application, said data format being selectable in accordance with an arrangement comprising at least one block selected from a group consisting of a first block, a second block and a third block, said first block being a sync block including a single sync signal data region, a single identification data region, a single main data region, and a single inner parity data region, said second block being a sync block including a single sync signal data region, a single identification data region, a single outer parity data region, and a single inner parity data region, said third block being a specific code pattern having the same length or size as said first and second blocks;

recording information of said predetermined data section on the recording medium in accordance with said selected data format and memorizing format information representing the selected data format into at least one of a predetermined area of said recording medium and a holder for accommodating said recording medium; and utilizing said memorized format information for reproducing data from said recording medium, wherein said step of utilizing the memorized format information is for discriminating a recording region containing a preamble or interblock gap from other recording regions, thereby allowing recording signals to be reproduced properly in accordance with the content of the application.

26. A digital data recording method comprising the steps of:

dividing a predetermined data section on a recording medium into a plurality of consecutive recording regions having the same length or size, each recording region comprising a plurality of data blocks each having the same length or size and including at least one region selected from a group consisting of a single sync signal data region, a single identification data region, a single main data region, a single inner parity data region, a single outer parity data region, and a specific code pattern region;

selecting a data format of each recording region on the basis of content of an application to be recorded; and memorizing selected format information into a corresponding recording medium;

wherein selection of said data format is accomplished by replacing a head portion of a recording region by a preamble or an interblock gap.

27. A digital data method comprising the steps of:

dividing information of one track on a recording medium into a plurality of consecutive recording regions, each having the same length or size and including a portion being replaceable by discrimination data;

selecting a data format of each recording region on the basis of content of an application to be recorded, so that a combination of recording regions meets a format of said application; and recording said information on the recording medium in accordance with said data format and memorizing format information representing the selected data format into at least one of a corresponding region of said recording medium and a holder for accommodating said recording medium, wherein selection of said data format is accomplished by replacing a head portion of a recording region by a preamble or an interblock gap.

28. A recording medium comprising:

a predetermined data section which is divided into a plurality of consecutive recording regions having the same length or size, each recording region comprising a plurality of data blocks each having the same length or size and including at least one region selected from a group consisting of a single sync signal data region, a single identification data region, a single main data region, a single inner parity data region, a single outer parity data region, and a specific code pattern region;

each recording region having a data format selected on the basis of content of an application to be recorded; and said recording medium memorizing selected format information, wherein selection of said data format is accomplished by replacing a head portion of a recording region by a preamble or an interblock gap.

29. A recording medium comprising:

a track which is divided into a plurality of consecutive recording regions, each having the same length or size and including a portion being replaceable by discrimination data; and each recording region having a data format selected on the basis of content of an application to be recorded, so that a combination of recording regions meets a format of said application;

wherein at least one of said recording medium itself and a holder for accommodating said recording medium memorizes format information representing the selected data format, selection of said data format is accomplished by replacing a head portion of a recording region by a preamble or an interblock gap.

30. A digital data reproducing method comprising the steps of:

reproducing data from a recording medium, said recording medium including a predetermined data section divided into a plurality of consecutive recording regions having the same length or size, each recording region comprising a plurality of data blocks each having the same length or size and including at least one region selected from a group consisting of a single sync signal data region, a single identification data region, a single main data region, a single inner parity data region, a single outer parity data region, and a specific code pattern region, each recording region having a data format selected on the basis of content of an application to be recorded; and utilizing a format information memorized in said recording medium for reproducing data from said recording section, wherein said step of utilizing the format information discriminates a recording region containing a preamble or interblock gap from other recording regions thereby allowing recording signals to be reproduced properly in accordance with the content of the application.

31. A digital data reproducing method comprising the steps of:

reproducing data from a recording medium, said recording medium including a track divided into a plurality of consecutive recording regions, each having the same length or size and including a portion being replaceable by discrimination data, each recording region having a data format selected on the basis of content of an application to be recorded, so that a combination of recording regions meets a format of said application; and utilizing a format information memorized in said recording medium itself or a holder or accommodating said recording medium, for reproducing data from said recording medium, wherein said step of utilizing the format information discriminates a recording region containing a preamble or interblock gap from other recording regions thereby allowing recording signals to be reproduced properly in accordance with the content of the application.

* * * * *